United States Patent

Keene et al.

[15] 3,700,060
[45] Oct. 24, 1972

[54] TRACTION MECHANISM ACTUATED PRESSURE SOURCE

[72] Inventors: Derek K. Keene, Philadelphia; John J. McElhare, Levittown, both of Pa.

[73] Assignee: Eaton Corporation, Cleveland, Ohio

[22] Filed: April 30, 1971

[21] Appl. No.: 139,122

[52] U.S. Cl. .............................. 180/53 FE, 180/66
[51] Int. Cl. ................................................ B66f 9/14
[58] Field of Search ..... 180/53 B, 53 FE, 65 R, 65 A, 180/66 R, 54; 303/10

[56] References Cited

UNITED STATES PATENTS 1,904,611   4/1933   Boyette .................... 180/66 B

*Primary Examiner*—Gerald M. Forlenza
*Assistant Examiner*—R. Johnson
*Attorney*—Teagno & Toddy

[57] ABSTRACT

In a vehicle such as an industrial truck, the traction mechanism operates a pump to charge an accumulator. When the traction mechanism is power actuated to propel the truck, the fluid moving through the pump is directed through a pressure free circuit in bypass relation to the accumulator so that the pump requires very little power. When power to the traction mechanism is withdrawn, as when the vehicle is coasting, the bypass circuit for the fluid moving through the pump is closed, and the fluid is directed to the accumulator to be charged. This charging of the accumulator acts to brake the traction mechanism, so that beneficial braking of the vehicle is contributed at the same time that the accumulator is charged. If, at any time, the accumulator does not have sufficient charge when a particular pressure operated device is to be operated, the circuit of an electric motor driving an auxiliary pump is actuated automatically so as to bring about the operation of the pressure operated device.

9 Claims, 5 Drawing Figures

INVENTORS
DEREK K. KEENE
BY JOHN J. McELHARE

Teagno & Toddy
ATTORNEY.

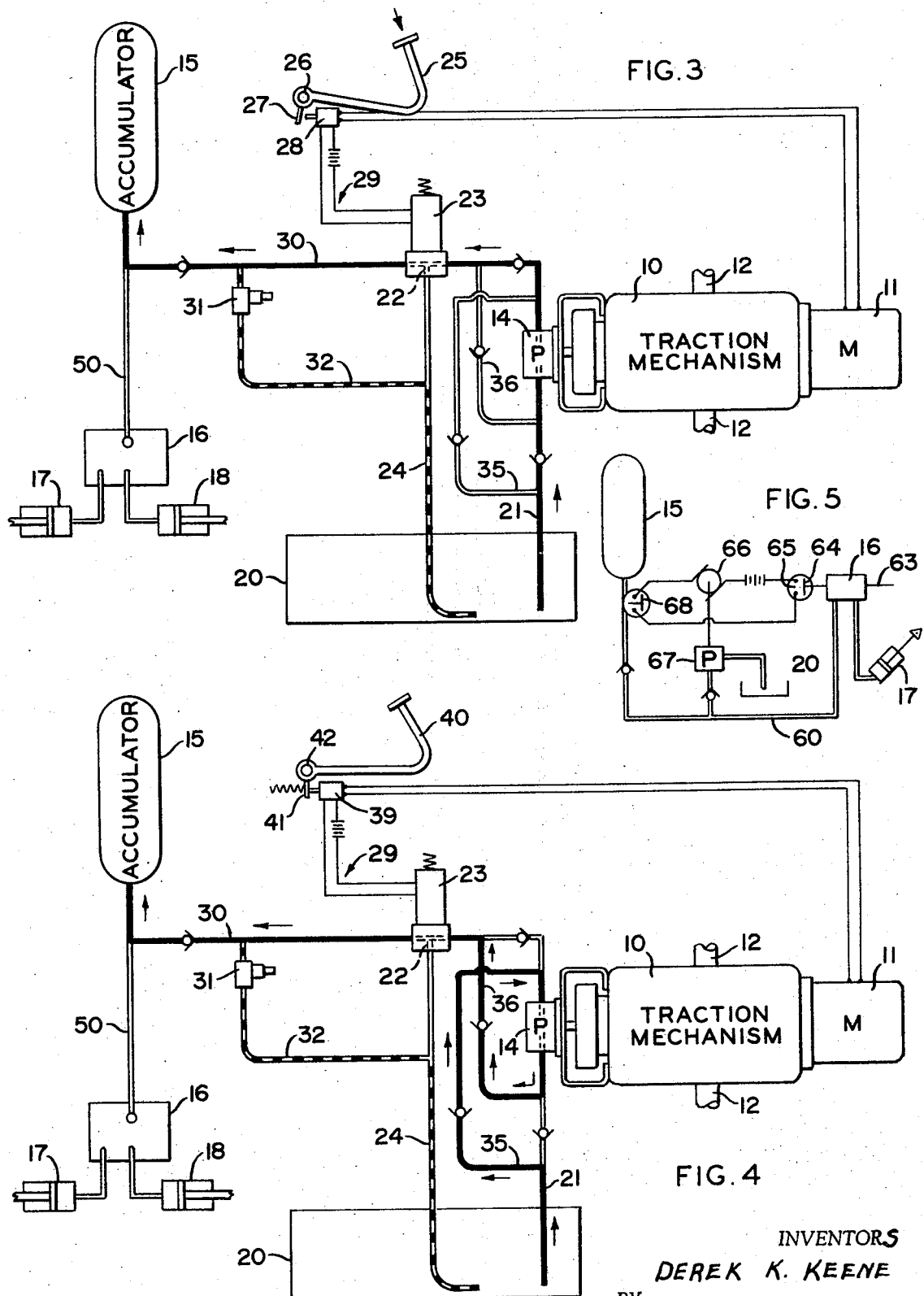

TRACTION MECHANISM ACTUATED PRESSURE SOURCE

BACKGROUND OF THE INVENTION

1. Field of the Invention

This invention relates to a vehicle such as an industrial truck, in which a number of hydraulically actuated devices are utilized to operate various mechanisms. More particularly, the invention relates to a vehicle such as an industrial truck in which such hydraulically actuated devices as tilting rams, clamping rams, steering rams, etc. are to be operated. The invention relates particularly to mechanism for supplying hydraulic pressure to the cylinders of the rams.

2. Description of the Prior Art

The development of suitable pressure sources for hydraulic rams in an industrial truck has long faced the art. The problem is particularly serious in electric industrial trucks because the power in an electric truck is supplied by a battery which naturally has a limited amount of energy, and must therefore be utilized in a most efficient manner. It has been suggested that the source of fluid pressure of the several rams of an industrial truck be an accumulator in which hydraulic pressure may be stored efficiently for utilization as required. A number of patents have issued to inventors covering means for charging accumulators in an efficient manner. So far as is known, the prior art does not contain a single entirely desirable arrangement for charging an accumulator, and certainly not one making the unusual contribution herein set forth.

SUMMARY OF THE INVENTION

The basic concept of the invention of this application involves the utilization of a pump driven by the traction mechanism of a vehicle for charging an accumulator when the vehicle is not power operated. Thus, this invention contemplates that a pump driven by the transmission will charge the accumulator only when the motor that drives the transmission mechanism is not power actuated. When the motor, if an electric motor is utilized, draws power from a battery, the pump will merely circulate the hydraulic fluid freely through a bypass circuit. When the electric circuit of the motor is broken, or when the motor does not draw electricity from the battery, the bypass circuit will be closed, and the hydraulic fluid will be directed from the pump to the accumulator to charge the accumulator. Obviously, the pump will require considerable energy in order to charge the accumulator, and will therefore act as a braking source.

Thus, it is the concept of this invention that the accumulator be charged without the utilization of energy from the battery, which is in itself a great contribution, and that this charging of the accumulator be utilized for braking the truck or other vehicle, which again is in itself a considerable contribution.

As a further feature of the invention, means are utilized for applying hydraulic pressure to the hydraulic rams of the vehicle from an auxiliary pump whenever the pressure in the accumulator is not quite sufficient. Thus, should the operator of the vehicle wish to transmit fluid under pressure from the accumulator to a hydraulic ram, he will operate the usual valve, and if there is not sufficient pressure in the accumulator, the auxiliary pump will be actuated to supply the required fluid pressure.

BRIEF DESCRIPTION OF THE DRAWINGS

The novel features which are believed to be characteristic of this invention are set forth with particularity in the appended claims. The invention itself, however, both as to its organization and method of operation together with further objects and advantages thereof, may best be understood by reference to the following description taken in connection with the accompanying drawings, in which:

FIG. 3 is a view similar to FIG. 1 but illustrating the electrical and hydraulic circuits when the accumulator is being charged, and the pump that is charging the accumulator is functioning to brake the truck;

FIG. 4 is a view similar to FIG. 2 but illustrating the electrical and hydraulic circuits when the accumulator is being charged, and the pump that is charging the accumulator is functioning to brake the truck; and FIG. 5 is a diagrammatic view illustrating the construction utilized for energizing a second pump for supplying fluid to a hydraulic ram in the event there is insufficient pressure in the accumulator for the particular purpose.

DESCRIPTION OF THE PREFERRED EMBODIMENT OF THE INVENTION

Figure 1:
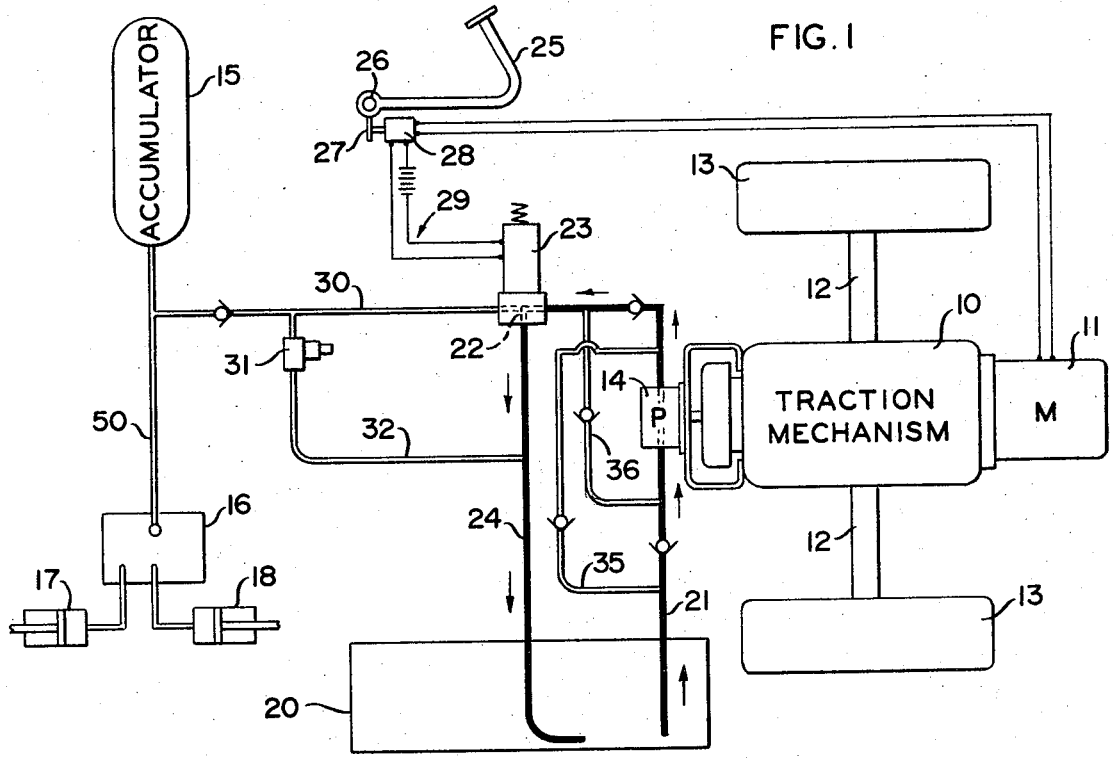
FIG. 1 is a diagrammatic view illustrating the preferred means for utilizing the concept of this invention, and showing the hydraulic circuit conditioned for free circulation of hydraulic fluid.

Referring now more particularly to the drawings, the traction mechanism in FIG. 1 is indicated generally by reference numeral 10, and the motor that drives the traction mechanism bears reference numeral 11. While the invention is particularly adapted for use with a battery energized electric motor in order to bring about the most effective utilization of the electrical charge of a battery, and with the motor and traction mechanism rotating with a pump, as will shortly appear, the basic concept is applicable to other drive combinations, as will be apparent.

Extending from the traction mechanism 10 are the usual drive axle housings 12, on each of which is mounted a traction wheel 13. A pump 14 is attached to the traction mechanism to be driven thereby through any suitable means. Actually, the pump 14 may be at the end of the drive shaft of the motor 11 if an electric motor is utilized. However, the pump is shown driven directly by the traction mechanism in order to better demonstrate the basic theory of the invention.

A hydraulic supply tank or sump is designated generally by reference numeral 20, while the hydraulic accumulator bears reference numeral 15. A control valve for directing hydraulic fluid to two hydraulic rams supplied by accumulator 15 is designated by reference numeral 16, while the two hydraulic rams are indicated by reference numerals 17 and 18. FIG. 1 illustrates the movement of the fluid by the pump 14 when the traction mechanism is driven by the motor 11 so as to drive the truck in a forward direction. As shown in heavy lines, fluid will flow from the tank 20 through pipe 21 into pump 14, and through a bypass passage 22 in an electrically actuated solenoid valve 23. It will then flow through a pipe 24 back to the tank 20. Obviously, no power of any consequence will be required to move the hydraulic fluid under these conditions.

The solenoid valve 23, under the broad concept of this invention, may be actuated by any one of several means. In FIG. 1 it is adapted to be actuated by a combined brake and controller treadle designated generally by reference numeral 25. Brake and controller treadle 25 is shown pivoted at 26, and having a short arm 27 adapted to control solenoid 23 as well as the circuit of motor 11 through a switch 28. When the treadle 25 is in its normal position with the brakes not applied, the switch 28 will be in position to hold open the electrical circuit 29 of the solenoid 23, and the solenoid will not be energized. At the same time, switch 28 will hold the circuit of motor 11 closed for conditioning and control by a suitable controller as is standard in the art, and need not be shown here. With the solenoid 23 not actuated, fluid will be directed into the bypass passage 22 and back to tank 20 as has been described. At the same time, motor 11 may be energized to drive the vehicle.

Referring now to FIG. 3, the treadle 25 is shown depressed to apply the brake. This action permits the movement of the switch 28 to close the electrical circuit 29 through the solenoid valve 23. At the same time, the circuit of motor 11 will be opened. Operation of the solenoid valve 23 will close bypass passage 22 and will bring about the flow of the fluid through a passage 30 to the accumulator 15. Naturally, the fluid will be directed to the solenoid 23 as in FIG. 1 through the pipe 21 leading from the tank 20. A standard relief valve 31 is illustrated, and permits the flow of fluid to the tank 20 through a passage designated 32. The purpose of the relief valve 31 is to direct fluid from the pump 14 to the tank 20 once the accumulator 15 has been fully charged, as those skilled in the art will well appreciate. Obviously, the energy required to charge the accumulator will be derived from the momentum of the truck.

Figure 2:
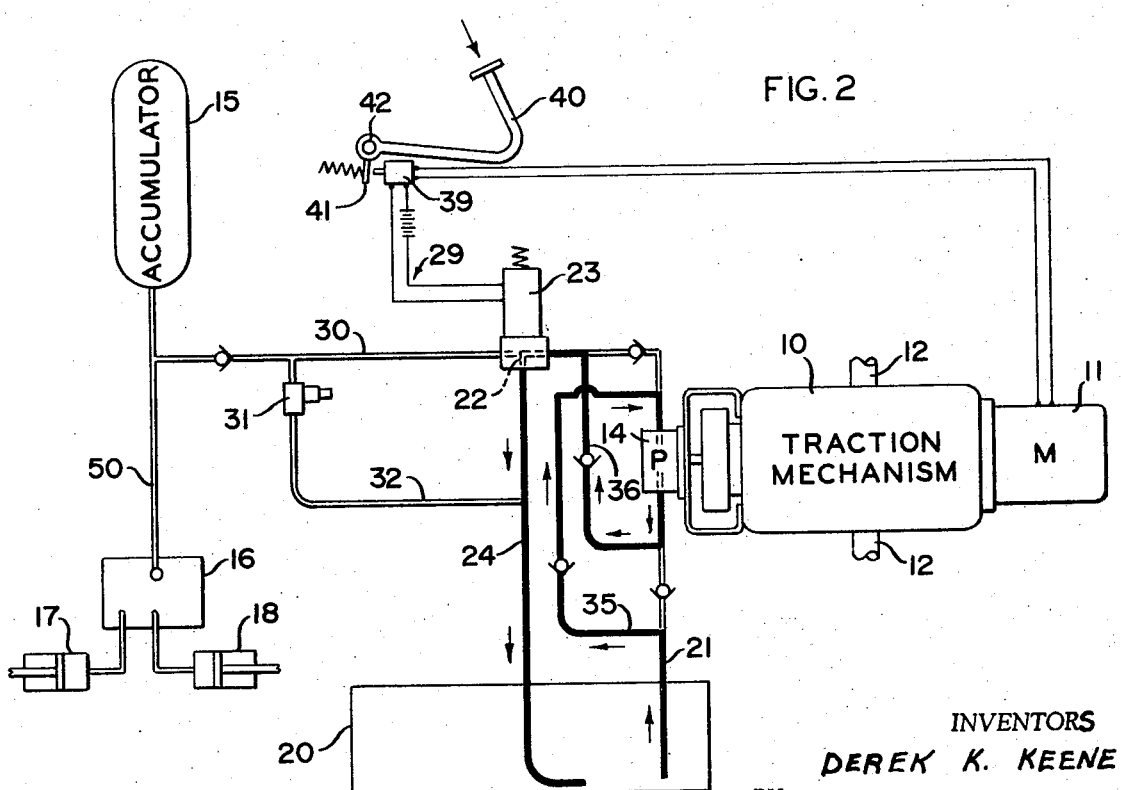
FIG. 2 is a view similar to FIG. 1 of a modified form of the invention and illustrating the hydraulic circuit in free fluid flow condition when the vehicle is moving under power in a direction reverse to that in which it is illustrated moving in FIG. 1.

In FIG. 2, the vehicle is shown moving in a rearward direction and with the solenoid valve 23 directing the fluid to the tank 20 through passage 22 and pipe 24 in bypass relation to the accumulator 15, the transmission being power driven by motor 11 as in FIG. 1, but in a reverse direction. Thus, fluid will flow from the intake pipe 21 through a pipe 35 into the pump 14, thence through a pipe 36 and bypass passage 22 into return pipe 24. The check valves utilized have not been set forth as their function is conventional.

In the showing of FIGS. 2 and 4, in addition to illustrating the hydraulic circuit conditions when the vehicle is operating in reverse, an alternate form of control for the output of pump 14 is illustrated. Specifically, instead of utilizing a brake for controlling the operation of the solenoid 23, there is found instead an accelerator treadle. This accelerator treadle is designated by reference numeral 40, and its switch operating portion is designated by reference numeral 41 while the switch is designated 39. When the accelerator treadle is depressed, as by rotation on its pivot axis 42, the part 41 is withdrawn from the switch 39, and the switch is designed to be in a position to hold open the circuit of solenoid 23 while closing the circuit of motor 11. Actually, treadle 40 may also operate a controller means to control the speed of motor 11 as is usual in many industrial trucks.

When the foot of the operator is taken away from the treadle 40, the treadle rotates under spring pressure into its position of FIG. 4, in which position the part 41 moves to condition the switch 39 to close the circuit of solenoid 23 and to open the circuit of motor 11. With the switch thus conditioned, fluid in FIG. 4 will flow from the pipe 21 to the pipe 35 and into the pump 14, and then through the pipe 36 into the solenoid valve 23. However, instead of flowing through the bypass passage 22, it will flow through the passage 30 as in FIG. 3, and into the accumulator 15.

It will now be apparent that when the solenoid valve 23 directs the fluid from the pump 14 to the tank 20 in bypass relation to the accumulator 15, very little energy is required to drive the pump 14. The motor 11 is therefor not burdened by the pump operation. However, when either of the switches 28 and 39 is properly conditioned incidental to the movement of the truck without utilizing the driving energy of the motor 11, the solenoid valve 23 will direct fluid into the accumulator so as to develop pressure in the accumulator. This development of pressure in the accumulator will naturally not utilize any energy whatsoever from the battery because the motor 11 is applying tractive effort. However, the pump 14 will require considerable energy which it will derive from the momentum of the traction mechanism 10, so that the pump will actually act as a brake for the truck.

As will be noted in FIG. 1, the accumulator 15 is connected through a passage 50 to the control valve 16, so that by suitable operation of the control valve 16, fluid may flow to either of the two hydraulic rams 17 or 18, as may be desired. This is merely conventional as will be appreciated. Those skilled in the art will understand that the pressure developed in the accumulator 15 may be utilized for any desired purpose, once pressure in the accumulator is established. It will also be understood that the control of the solenoid 23 and motor 11 may be achieved by means other than those shown.

In FIG. 5 there is illustrated a construction whereby fluid from a second pump may be transmitted to a hydraulic ram such as ram 17 in the event the accumulator 15 is not adequately charged. Thus, in FIG. 5, the accumulator 15 is connected by a passage 60 to control valve 16 for controlling the flow of fluid to hydraulic ram 17, the operating rod of the control valve 16 being designated by reference numeral 63. Upon movement of the rod 63 to direct fluid to the ram 17 through a proper setting of the valve 16, a switch blade 64 fixed to the rod 63 closes at 65 the circuit of an electric motor 66. This electric motor is adapted to drive a pump 67 that also supplies fluid through the passage 60 for flow to control valve 16. The electric circuit of the motor 66 includes also a switch 68 that is operated by the pressure developed within the accumulator.

Thus, if the accumulator 15 has sufficient pressure to operate the ram 17 when valve 16 is operated by rod 63, the switch at 68 will be open, and therefore the circuit of the motor 66 will remain open even though the valve rod 63 closes the switch at 64, 65. Therefore, when there is sufficient hydraulic pressure within the accumulator 15, the motor 66 will not be operated upon a requirement for the flow of fluid into the ram 17. However, when flow of fluid into the ram 17 is required, the movement of the control rod 63 will close the circuit at switch 64, 65, and if the circuit at 68 is closed because of insufficient pressure within the accumulator 15, the motor 66 will be energized so as to drive the pump 67 to supply fluid at adequate pressure to the control valve 16 and therefore to the hydraulic ram 17.

From the above description, it can be appreciated that the particular means employed to change the hydraulic circuit from a bypass condition to an accumulator charging condition is relatively unimportant. For either direction of operation, depression of a brake and controller treadle or release of an accelerator treadle can be employed for this purpose, as illustrated, or other means operable upon deenergization of the traction motor can be employed.

It is believed that the basic concept of this invention and the apparatus set forth will now be clearly understood by those skilled in the art.

I now claim:

1. In a vehicle of the class described, traction mechanism for said vehicle, a traction motor for driving said traction mechanism, a pump operable upon movement of said vehicle, and to pump fluid through a relatively pressure free hydraulic circuit when said motor drives said vehicle by said traction mechanism, and means for directing the fluid from said pump to a second hydraulic circuit against pressure means when said traction motor is not driving said traction mechanism and said vehicle is moving, whereby said pump acts as a dynamic brake.

2. In the combination of claim 1, the feature that said pressure means is an accumulator for storing pressure to be utilized to operate hydraulically actuated mechanism on said vehicle.

3. In the combination of claim 2, the feature that said pressure free hydraulic circuit is in bypass relation to said accumulator.

4. In the combination of claim 1, the feature that said motor is an electric motor in an electric traction circuit, and means whereby the opening of said traction circuit is a prerequisite to the directing of the fluid to said second hydraulic circuit.

5. In the combination of claim 2, the feature that said hydraulically actuated mechanism is functionally in the circuit of a second pump driven by a pump motor, and means whereby said second pump and motor are rendered effective to apply hydraulic pressure to said hydraulically actuated mechanism when said accumulator is pressure charged by said traction mechanism below a predetermined level, and ineffective when said accumulator is pressure charged above said predetermined level.

6. In the combination of claim 1, the feature that said pump is driven by said traction mechanism and that said pressure means is an accumulator connected by a suitable hydraulic circuit with said pump for charging thereby, said free hydraulic circuit being a bypass hydraulic circuit for said pump for bypassing said accumulator, means for maintaining one or the other of said hydraulic circuits open while maintaining the other of said circuits closed, and means whereby the motor drive is operable to said traction mechanism when said bypass circuit is open, and is not operable to drive said traction mechanism when said accumulator circuit is open.

7. In a vehicle of the class described, a traction motor, a traction mechanism through which said motor propels said vehicle, a pump, an accumulator adapted to be charged by said pump, means rendering said pump operative to charge said accumulator when said vehicle is moving under conditions wherein said vehicle is not propelled by said motor, and means rendering said pump inoperative to charge said accumulator when said vehicle is propelled by said motor through said traction mechanism.

8. In the combination of claim 6, the feature that said motor is an electric motor and that the said pump is actuated by the momentum of the vehicle to charge the accumulator when said motor is not propelling said vehicle.

9. The combination of claim 6, in which said pump is operatively connected to said traction mechanism.

* * * * *